US011012391B2

(12) United States Patent
Geva et al.

(10) Patent No.: US 11,012,391 B2
(45) Date of Patent: *May 18, 2021

(54) EMAIL MESSAGE GROUPING

(71) Applicant: MailWise Email Solutions Ltd., Tel Aviv (IL)

(72) Inventors: Shai Geva, Tel Aviv (IL); Amitay Svetlit, Ramat Gan (IL)

(73) Assignee: MAILWISE EMAIL SOLUTIONS LTD., Tel Aviv (IL)

( * ) Notice: Subject to any disclaimer, the term of this patent is extended or adjusted under 35 U.S.C. 154(b) by 134 days.

This patent is subject to a terminal disclaimer.

(21) Appl. No.: 16/223,148

(22) Filed: Dec. 18, 2018

(65) Prior Publication Data

US 2019/0124026 A1     Apr. 25, 2019

Related U.S. Application Data

(63) Continuation of application No. 14/749,777, filed on Jun. 25, 2015, now Pat. No. 10,187,339.

(60) Provisional application No. 62/017,377, filed on Jun. 26, 2014.

(51) Int. Cl.
*H04L 12/58* (2006.01)
*G06Q 10/10* (2012.01)

(52) U.S. Cl.
CPC ......... *H04L 51/12* (2013.01); *G06Q 10/107* (2013.01); *H04L 51/02* (2013.01); *H04L 51/16* (2013.01); *H04L 51/22* (2013.01); *H04L 51/36* (2013.01); *H04L 51/14* (2013.01)

(58) Field of Classification Search
None
See application file for complete search history.

(56) References Cited

U.S. PATENT DOCUMENTS

| 7,249,175 | B1 * | 7/2007 | Donaldson | G06Q 10/107 709/206 |
| 7,509,381 | B1 * | 3/2009 | Hutchinson | G06Q 10/107 370/260 |
| 7,587,461 | B2 * | 9/2009 | Baluja | G06Q 10/107 709/206 |
| 7,650,382 | B1 * | 1/2010 | Sobel | G06Q 10/107 709/206 |
| 7,739,337 | B1 * | 6/2010 | Jensen | H04L 51/12 709/206 |

(Continued)

*Primary Examiner* — William L Bashore
*Assistant Examiner* — Nathan K Shrewsbury
(74) *Attorney, Agent, or Firm* — Kligler & Associates Patent Attorneys Ltd

(57) ABSTRACT

An email client includes a network interface, a hardware processor, a user interface, an identification module, a content email management module and one or both of a grouping module and bypass email handling module. The network interface communicates with at least one service provider email server. The identification module identifies content emails by analyzing email traffic in an email account established on the service provider's email server. Content email senders are classified as content providers. The content email management module obtains content emails. The grouping module groups content emails from each content provider for display as respective single content item. Optionally, a bypass email handling module implants content emails received over said bypass channel into an email account or accounts.

29 Claims, 8 Drawing Sheets

(56) References Cited

U.S. PATENT DOCUMENTS

| | | | |
|---|---|---|---|
| 7,933,957 B2* | 4/2011 | Daniell | H04L 69/08 709/206 |
| 8,417,787 B1* | 4/2013 | Muir | G06Q 10/107 709/206 |
| 9,177,293 B1* | 11/2015 | Gagnon | G06Q 10/107 |
| 9,596,196 B1* | 3/2017 | Hills | H04L 51/16 |
| 2002/0073156 A1* | 6/2002 | Newman | G06Q 10/107 709/206 |
| 2005/0076220 A1* | 4/2005 | Zhang | H04L 63/126 713/176 |
| 2005/0102366 A1* | 5/2005 | Kirsch | G06Q 10/107 709/207 |
| 2005/0223057 A1* | 10/2005 | Buchheit | G06F 16/24 709/203 |
| 2005/0262209 A1* | 11/2005 | Yu | H04L 51/28 709/206 |
| 2006/0031324 A1* | 2/2006 | Chen | H04L 51/22 709/206 |
| 2006/0085504 A1* | 4/2006 | Yang | H04L 51/12 709/206 |
| 2007/0118759 A1* | 5/2007 | Sheppard | H04L 63/145 713/188 |
| 2007/0208868 A1* | 9/2007 | Kidd | G06Q 10/107 709/229 |
| 2008/0140781 A1* | 6/2008 | Bocharov | G06Q 10/107 709/206 |
| 2008/0162651 A1* | 7/2008 | Madnani | G06Q 10/107 709/206 |
| 2008/0168149 A1* | 7/2008 | Daniell | H04L 51/12 709/206 |
| 2009/0094340 A1* | 4/2009 | Gillai | G06F 15/16 709/206 |
| 2010/0005146 A1* | 1/2010 | Drako | G06Q 10/00 709/206 |
| 2011/0213849 A1* | 9/2011 | Ben-Yoseph | H04L 51/12 709/206 |
| 2011/0258272 A1* | 10/2011 | Drako | G06Q 10/107 709/206 |
| 2012/0005282 A1* | 1/2012 | Steinbok | G06F 16/353 709/206 |
| 2012/0185797 A1* | 7/2012 | Thorsen | G06Q 10/00 715/784 |
| 2012/0254321 A1* | 10/2012 | Lindsay | G06Q 10/107 709/206 |
| 2013/0332850 A1* | 12/2013 | Bovet | G06Q 10/107 715/752 |
| 2015/0032824 A1* | 1/2015 | Kumar | G06F 3/0482 709/206 |
| 2015/0381544 A1* | 12/2015 | Geva | G06Q 10/107 715/752 |

* cited by examiner

EMAIL MESSAGE GROUPING

RELATED APPLICATIONS

This application is a continuation of U.S. patent application Ser. No. 14/749,777, filed Jun. 25, 2015, which claims benefit of U.S. Provisional Patent Application No. 62/017,377, filed Jun. 26, 2014, the contents of which are incorporated herein by reference.

BACKGROUND

The present invention, in some embodiments thereof, relates to grouping emails for display as a single email item, and, more specifically, but not exclusively, to grouping emails sent by a content provider.

Electronic mail is a method of exchanging digital messages from an author to one or more recipients. Typically, email operates across the Internet or other computer networks. Email servers accept, forward, deliver and store electronic mail messages.

Gmail™ and Microsoft OUTLOOK™ are exemplary messaging applications that enable users to exchange electronic mail messages through networked computers.

Electronic mail messages (also denoted herein "email" and "email message") are often sent to and received by a group of recipients. Typically, during an email correspondence amongst a group of recipients, one or more of the recipients responds to or forwards received emails using reply, reply all, and forward commands. This exchange of emails may become a conversation. As a result, the number of emails appearing in the recipient incoming mail box (e.g. Inbox) and can range up to tens of emails for a single conversation.

In addition, certain service and content providers send the recipient quantities of email messages providing updates, notifications, status, promotions, etc. Examples include FaceBook™ which sends its subscribers daily (or more frequent) notifications of activities occurring in their account, FoxNews™ which sends its subscribers emails regarding breaking news several times a day, or the local telephone company which sends its customers bills or other notifications.

The above two forms of communications, namely email conversations and frequent updates/notifications, may over-populate the recipient's incoming mail box (e.g. Inbox) and make it very hard to manage. Inbox over-population is particularly problematic in mobile device email applications due to the small size of the screen, making the management task very hard on the recipient.

Some solutions address Inbox overpopulation by grouping the emails by conversation. That is the recipient's mail program attempts to group together the emails that seem to belong to the same conversation. This reduces the size of the Inbox due to the conversation grouping.

It should be noted that some email clients allow alternative types of sorting/grouping. For example MS Outlook™ offers sorting by sender. This is usually an impractical way to manage the Inbox since it contradicts sorting by date (which is typically the most important sorting criterion for an Inbox).

It should be also noted that some email clients create a folder that contains all incoming emails that are identified as promotions. This does not resolve the update/notification problem since these are normally too important to the recipient, who wants to see them on the main Inbox and not to have them placed in a "secondary" folder.

Other solutions allow users to define rules which group all emails arriving from specific sender and put them in a separate folder. However this prevents the recipient from seeing them in the Inbox.

Various solutions have been developed to manage email correspondences. For example one solution is a process for composing and displaying a consolidated message document.

The overload of email has driven some email providers (e.g. Gmail, Yahoo, etc.) to carry out more radical steps. In some cases they "filter" email messages arriving to their users from certain sources. For example, they might filter email messages sent by certain commercial providers. The filtered email messages might be promotions which are of no interest to the user. However, the emails messages may, for example, be an interaction between the commercial provider and its users (e.g. answers to questions etc.), in which case the filtering disrupts the desired communication with the commercial provider.

Email filtering may be done by moving the corresponding email messages to the SPAM folder, by blocking them altogether or by some other means. This causes a problem to both the commercial provider and its users who want to communicate with each other and their email messages get blocked. This problem is denoted herein the "blocking problem".

SUMMARY

According to an aspect of some embodiments of the present invention there is provided an email client which includes:

i) a network interface for electrical communication with at least one service provider email server;

ii) a hardware processor in electrical communication with the network interface;

iii) a user interface;

iv) an identification module in electrical communication with the network interface and the hardware processor, configured to identify content emails by analyzing email traffic in a first email address established on a first service provider email server, and to classify senders of the content emails as content providers;

v) a content email management module in electrical communication with the network interface, the hardware processor, the user interface and the identification module, configured to obtain the identified content emails; and vi) a grouping module in electrical communication with the hardware processor, the user interface and the content email management module configured to group a plurality of obtained content emails received from a single content provider for display as a respective single content item.

According to some embodiments of the invention, the identification module is further configured to identify content emails by analyzing email traffic in a second email address established on a second service provider email server, and to classify senders of the content emails as content providers.

According to some embodiments of the invention, the identification module is further configured to identify content emails by analyzing email traffic in a second email address established on the first service provider email server, and to classify senders of the content emails as content providers.

According to some embodiments of the invention, the content email management module is configured to receive content emails over a bypass channel, wherein the bypass channel includes at least one of: forwarding via a bypass server and a direct channel established between a content provider and the email client.

According to some embodiments of the invention, the email client further includes a bypass email handling module configured to implant a content email received over the bypass channel into an email account.

According to some embodiments of the invention, bypass email handling module is configured to provide a content provider with a bypass email address for sending content emails to the email client via the bypass server.

According to some embodiments of the invention, the bypass email handling module is configured to auto-forward an email, received from the content provider via the bypass channel, to the first email address, wherein a reply field of the auto-forwarded email is set to an address of the content provider.

According to some embodiments of the invention, the bypass email handling module is configured to auto-forward an email, received from the content provider via the bypass channel, to the first email address, wherein a reply field of the auto-forwarded email is set to the first email address.

According to some embodiments of the invention, the bypass email handling module is configured to insert an email, received from the content provider via the bypass channel, into a specified folder of the email client.

According to some embodiments of the invention, the bypass email handling module is configured to insert an email, received from the content provider via the bypass channel, synchronously into a specified email folder of the email client and a respective folder of the first email address established on the first service provider email server.

According to some embodiments of the invention, the obtaining includes receiving emails from the identified content provider at the first email address. According to some embodiments of the invention, the content email management module is further configured to insert the received email into a specified email folder of the email client.

According to some embodiments of the invention, the single content item further includes at least one of:
  i) the respective content provider; and
  ii) a number of emails grouped in the content item.

According to some embodiments of the invention, the grouping module is further configured to ungroup the single content item for display as separate emails from the respective content provider, in accordance with input from the user interface.

According to some embodiments of the invention, the identification module is further configured to identify email conversations by analyzing email traffic and the grouping module is further configured to group emails participating in the email conversation for display as a single conversation item.

According to some embodiments of the invention, the grouping module is further configured to ungroup the single conversation item for display as separate emails participating in the conversation, in accordance with input from the user interface.

According to some embodiments of the invention, the identification module is further configured to identify stand-alone emails for display as ungrouped emails.

According to some embodiments of the invention, the identification module is configured to identify content email in accordance with at least one of:
  i) a number of emails from a sender which participate in email conversations;
  ii) a proportion of emails from the sender which participate in email conversations;
  iii) a number of emails from the sender which are responded to; and
  iv) a number conversations with the sender.

According to some embodiments of the invention, the identification module is configured to include each received email in a single item, wherein the item is one of: a conversation item, a content item and a stand-alone item.

According to an aspect of some embodiments of the present invention there is provided a method for grouping emails for display. The method includes:
  i) identifying content emails by analyzing email traffic on a first email address established on a first service provider email server and classifying respective senders of the content emails as content providers;
  ii) obtaining the identified content emails; and
  iii) grouping a plurality of obtained content emails from a content provider for display as a respective single content item.

According to some embodiments of the invention, the method further includes identifying content emails by analyzing email traffic on a second email address established on a second service provider email server and classifying respective senders of the content emails as content providers.

According to some embodiments of the invention, the method further includes identifying content emails by analyzing email traffic on a second email address established on the first service provider email server and classifying respective senders of the content emails as content providers.

According to some embodiments of the invention, the method further includes receiving content emails over a bypass channel with a content provider, wherein the bypass channel includes at least one of: forwarding via a bypass server and a direct channel established between a content provider and the email client.

According to some embodiments of the invention, the method further includes establishing a bypass email address on the bypass server, providing the content provider with the bypass email address and instructing the content provider to send the content emails via the bypass email address.

According to some embodiments of the invention, providing the content provider with the bypass email address includes instructing the bypass server to provide the bypass email address to the content provider.

According to some embodiments of the invention, the method further includes processing an email received via the bypass channel by one of:
  i) auto-forwarding the email received via the bypass channel to the first email address, wherein a reply field of the auto-forwarded email is set to the first email address;
  ii) auto-forwarding the email received via the bypass channel to the first email address, wherein a reply field of the auto-forwarded email is set to an address of the content provider;
  iii) inserting the email received via the bypass channel into a specified email folder of the email client; and
  iv) inserting the email received via the bypass channel synchronously into a specified email folder of the email client and a respective folder of the first email address established on the first service provider email server.

According to some embodiments of the invention, the method further includes receiving an email via the bypass channel and deriving the first email address from the bypass email address. Optionally, the deriving is one of: rule-based and search-based.

According to some embodiments of the invention, the method further includes at the email client, ungrouping the content item for display as separate emails in accordance with input from a user interface of the email client.

According to some embodiments of the invention, the method further includes classifying a received email as one of:

i) a conversation email for inclusion in an email conversation item;
ii) a content item email for inclusion in a content item; and
iii) a stand-alone email for display as an ungrouped email.

According to some embodiments of the invention, the method further includes updating the classification upon receipt of a new email at the email client.

According to an aspect of some embodiments of the present invention there is provided an email client which includes:

i) a network interface for electrical communication with at least one service provider email server;
ii) a hardware processor in electrical communication with the network interface;
iii) a user interface;
iv) a content email management module in electrical communication with the network interface, the hardware processor, and the user interface, configured to obtain emails over a bypass channel; and
v) a bypass email handling module configured to implant a content email received over the bypass channel into an email account established on a service provider email server.

According to some embodiments of the invention, the bypass channel includes at least one of: forwarding via a bypass server and a direct channel established between an email sender and the email client.

According to some embodiments of the invention, the bypass email handling module is configured to provide a content provider with a bypass email address for sending content emails to the email client via the bypass channel.

According to some embodiments of the invention, the bypass email handling module is configured to auto-forward an email, received via the bypass channel, to the email account, wherein a reply field of the auto-forwarded email is set to an address of a respective email sender.

According to some embodiments of the invention, the bypass email handling module is configured to auto-forward an email, received via the bypass channel, to the email account, wherein a reply field of the auto-forwarded email is set to a respective email address of the email account.

According to some embodiments of the invention, the bypass email handling module is configured to insert an email, received via the bypass channel, into a specified folder of the email client.

According to some embodiments of the invention, the bypass email handling module is configured to insert an email, received from the content provider via the bypass channel, synchronously into a specified email folder of the email client and a respective folder of the email account.

According to some embodiments of the invention, the email client further includes an identification module in electrical communication with the network interface, the content email management module and the hardware processor, configured to identify content emails by analyzing email traffic in the email account, and to classify senders of the content emails as content providers.

According to some embodiments of the invention, the email client further includes a grouping module in electrical communication with the hardware processor, the user interface and the content email management module configured to group a plurality of obtained content emails received from a single content provider for display as a respective single content item.

According to some embodiments of the invention, the single content item further includes at least one of:

i) the respective content provider; and
ii) a number of emails grouped in the content item.

According to some embodiments of the invention, the grouping module is further configured to ungroup the single content item for display as separate emails from the respective content provider, in accordance with input from the user interface.

According to some embodiments of the invention, the identification module is further configured to identify email conversations by analyzing email traffic and the grouping module is further configured to group emails participating in the email conversation for display as a single conversation item.

According to some embodiments of the invention, the grouping module is further configured to ungroup the single conversation item for display as separate emails participating in the conversation, in accordance with input from the user interface.

According to some embodiments of the invention, the identification module is further configured to identify stand-alone emails for display as ungrouped emails.

According to some embodiments of the invention, the identification module is configured to identify content email in accordance with at least one of:

i) a number of emails from a sender which participate in email conversations;
ii) a proportion of emails from the sender which participate in email conversations;
iii) a number of emails from the sender which are responded to; and
iv) a number conversations with the sender.

According to some embodiments of the invention, the identification module is configured to include each received email in a single item, wherein the item is one of: a conversation item, a content item and a stand-alone item.

According to an aspect of some embodiments of the present invention there is provided a method for managing emails received over a bypass channel. The method includes: at an email client, receiving emails over a bypass channel and implanting emails received over the bypass channel into an email account.

According to some embodiments of the invention, the bypass channel includes at least one of: forwarding via a bypass server and a direct channel established between an email sender and the email client.

According to some embodiments of the invention, the method further includes identifying content emails by analyzing email traffic on an email address established on a service provider email server and classifying respective senders of the content emails as content providers.

According to some embodiments of the invention, the method further includes instructing the content provider to send content email over the bypass channel.

According to some embodiments of the invention, implanting an email includes at least one of:

i) auto-forwarding the email received via the bypass channel to the email address, wherein a reply field of the auto-forwarded email is set to the email address;
ii) auto-forwarding the email received via the bypass channel to the email address, wherein a reply field of the auto-forwarded email is set to an address of a respective email sender;

iii) inserting the email received via the bypass channel into a specified email folder of the email client; and iv) inserting the email received via the bypass channel synchronously into a specified email folder of the email client and a respective folder of the email account.

According to some embodiments of the invention, the method further includes receiving an email forwarded through a bypass email address by a bypass server and deriving the email account from the bypass email address. Optionally, the deriving is one of: rule-based and search-based.

According to some embodiments of the invention, the method further includes grouping a plurality of obtained content emails from the sender for display as a single content item.

According to some embodiments of the invention, the method further includes ungrouping the content item for display as separate emails in accordance with input from a user interface of the email client.

According to some embodiments of the invention, the method further includes classifying a received email as one of:

i) a conversation email for inclusion in an email conversation item;

ii) a content item email for inclusion in a content item; and iii) a stand-alone email for display as an ungrouped email.

According to some embodiments of the invention, the method further includes updating the classification upon receipt of a new email at the email client.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DETAILED DESCRIPTION

Figure 1:
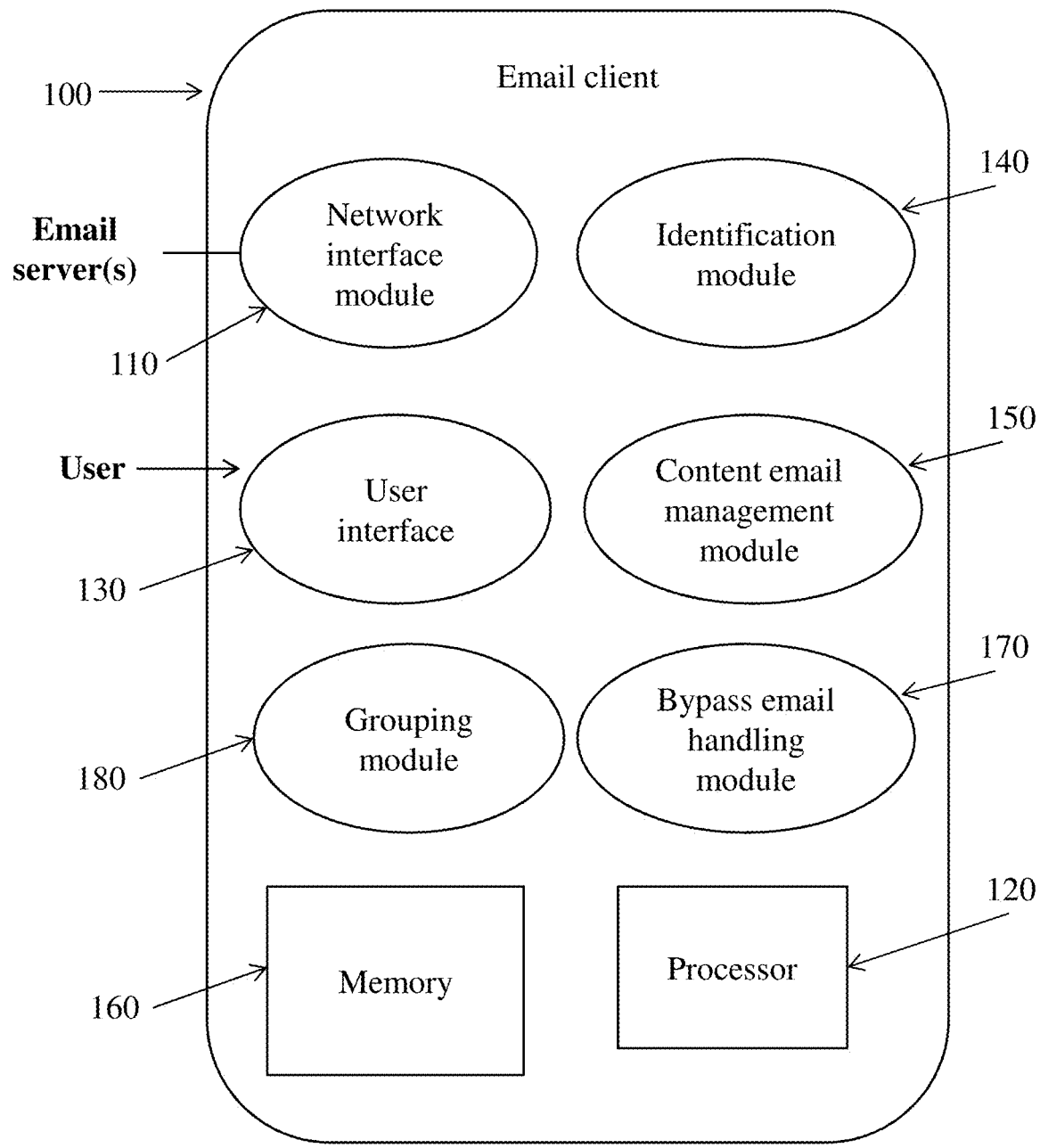
FIG. 1 is a simplified block diagram of an email client according to embodiments of the invention.

The present invention, in some embodiments thereof, relates to grouping emails for display as a single email item, and, more specifically, but not exclusively, to grouping emails sent by a content provider.

Email clients are often required to manage and display large numbers of emails to a user. Service and content providers often send multiple update and content emails to the user, which accumulate in the Inbox or another folder specified by the user. Similarly, large numbers of emails may be generated in email conversations amongst users, particularly when several users read and respond to previous emails in the conversation.

In order to deal with the large quantities of emails received by the user, embodiments herein group emails received from a particular content provider for display as a single content item. The content item may later be ungrouped for display as individual emails, for example by clicking on the item. Thus the quantity of items displayed to the user is reduced, but the user is still aware that the content emails are there to be viewed.

A similar process may be performed for conversation emails. The conversation emails are grouped for display to the user as a single item, which may be expanded into the separate emails.

As used herein the term "email client" means any application which is used to access and manage a user's email. The email client manages email for one or more email accounts, where each email account has a respective email address.

Typically an email account is established by a user with an email service provider. For each user account, emails are routed to and from the email address via the respective service provider's email server. The email accounts may be established with a single service provider or with multiple service providers. For example, a user may have several Gmail addresses, a home email address and a work email address, where all of the email addresses are accessed and managed by the same email client.

The email client may be installed on a device, a mobile device, a tablet computer, a mobile telephone, a personal computer, web-based, on a server or on any other system element which can access email for one or more email accounts.

For clarity, some embodiments below present an email client which performs content email grouping for a single email address, which is denoted the "content recipient email address" or "content recipient". It is to be understood that in cases where the email client manages multiple email accounts, the email client may perform content item grouping for one, some or all of the email accounts (for example see FIG. 4B).

As used herein the term "content provider" means any sender which sends multiple emails to a content recipient email address, where the sending of at least some of the emails is initiated by the content provider, not in response to an email sent by the user.

The term "content provider" is not limited to senders which initiate all email communications to a content recipient. Optionally, the content provider may also have email interactions with the content recipient in which the content provider responds to emails sent from the recipient email address.

As used herein the term "content email" means emails that are sent by a content provider to the content recipient. The term "content email" includes, but is not limited to, email which is sent by the content provider and is not in response to email received by the content provider from the content recipient.

As used herein the term "content item" means a dataset or other unified representation of multiple content emails from a given content provider which are aggregated for display as a single element in an email folder, and which may be expanded for display as separate content emails in accordance with input to a user interface.

Content emails may be identified by the email client by analyzing parameters in the email traffic which indicate that the email was sent by a content provider, and is not a stand-alone email or conversation email. For example, when a recipient does not respond to a large number of emails received from a particular sender but also does not classify them as spam, the email client may deduce that the sender is a content provider and that email received from the sender may be grouped into a content item.

In some embodiments the user designates the sender as a content provider to the email client, in order to distinguish the content provider from a spammer.

In order to prevent the email provider from blocking emails from the content provider before they are delivered to the user, a bypass channel which bypasses the service provider email server may be set up. The bypass channel may include one or both of:

i) Content provider forwarding of content email via a bypass server; and ii) Direct communication between the content provider and the email client.

Optionally, the bypass server is an email server. When a bypass email server is used, the content provider sends the user content emails to a bypass email address on the bypass server. The bypass email address corresponds to a content recipient email address which is initially known to the content provider.

In additional or alternate embodiments, content emails are received at an email account on the service provider email account (i.e. not through the bypass channel).

The content email may be obtained by the email client from the bypass server by any means known in the art including one or more:

1) Forwarding by the bypass server to the email client; and

2) Retrieval by the email client off the bypass email server.

Direct communication between the content provider and the email client may be implemented by any means known in the art (e.g. via a server, a direct link, instant messaging, etc.).

Emails received over the bypass channel may be specially processed by the email client so that the user is unaware that they were sent to over the bypass channel and not to the content recipient email address.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference is now made to FIG. 1, which is a simplified block diagram of an email client according to embodiments of the invention. The email client may be an email reader, a mail user agent (MUA) such as a computer program used to access and manage a user's email and/or a web application running on one or more web servers to provide message management, composition, and reception functions, for example a webmail.

Email client 100 accesses and manages email for one or more email accounts, each having a respective email address. Email client 100 may run by one or more computing units, for example one or more servers and/or one or more client devices, such as smartphones, tablets, desktops and/or the like which includes:

i) Network interface 110;
ii) Hardware processor 120;
iii) a memory which stores a code executed by the computing unit. The code includes code instructions for
managing or executing a User interface 130;
managing or executing an Identification module 140, for instance a software component;
v) managing or executing a Content email management module 150, for instance a software component; and
managing or executing a grouping module 180 and/or bypass email handling module 170 for instance a software component.

Optionally, email client 100 further includes a dedicated memory 160.

Alternately or additionally, email client 100 stores data in a memory element of the device or system on which it is installed. For brevity, the email client 100 and the one or more computing units which execute the email client 100 may interchangeably referred to as an email client.

Identification Module

Identification module 140 identifies content emails by analyzing email traffic between senders and the content recipient email address. The analysis process involves ongoing examination of received email messages and dynamic learning of the behavior of email messages received from each sender. This dynamic learning reveals which email is a content email, which was sent by a content provider. The learning may be rule-based, for example by learning the pattern of emails received from the content provider and recognizing that the recipient does not reply to them.

Optionally, content emails received from a particular content provider are grouped into a content item associated with the content provider, for display in the Inbox or other specified email folder.

Optionally, the analysis studies the pattern of email messages arriving from certain source and determines that typically these emails do not become part of a conversation and rather remain on their own. For example, updates from FoxNews™ may not become part of a conversation since the recipient does not send a reply to FoxNews™.

Optionally, identification module 140 identifies content emails based on specified parameters, where at least some of these parameters are determined by analysis of the email traffic. Optionally, these parameters include one or more of:

i) The number of emails from a particular email sender that do not belong to a conversation;
ii) The number of conversations that are conducted with the particular email sender;
iii) Emails received by the recipient from other senders;
iv) Decisions and messages statistics for other recipients (e.g. if a certain sender was identified by one recipient as a content provider whose emails should be grouped, this identification may be passed to other recipients); and
v) Information from other sources (e.g. user input that a particular sender is a content provider).

Senders of content emails are classified as content providers by identification module 140. Optionally, after a sender is classified as a content provider, further emails received from this sender are designated content emails, without analysis on an email by email basis. The sender's status as a content provider is optionally updated as required, if the pattern of the email traffic between the content recipient and the sender changes.

A general mathematical or logic function may be applied to some or all of the above parameters, where the value of the function indicates whether a particular email or group of emails should or should not be grouped.

Exemplary embodiments of functions used to make the group/no group decision for emails sent by a particular sender are now described. In one exemplary embodiment, the number of messages from the sender that do not belong to a conversation are counted (denote this number A) and the number of conversations from the sender that are conducted with that source are counted (denote it C). A function is F(A,C) is defined such that for any value of A and C returns either a decision "group" (g) or "no-group" (ng). For example, an email is grouped (that is F(A,C)=g) if and only if A/C is greater than some threshold X.

An alternative formula G(A,c) relates to the parameter A as above and to the number of emails, c, received from the sender that are part of a conversation. A more general formula H(A,C,c) might relate to all three parameters.

Optionally, identification module 140 identifies each received email as one of:
 i) A conversation email (which may be included in a conversation item);
 ii) A content email (which may be included in a content item); and
 iii) A stand-alone email for display as a separate (i.e. ungrouped) email.

Optionally, email type identification is performed by identification module 140 as follows. First an email that is part of an existing conversation is identified as a conversation email. Identification of an email conversation may be done by any method known in the art, using several mechanisms such as (but not limited to): a) the subject line, b) the quoted text, c) the sender and recipient, and d) special fields that appear in the message metadata and are used to relate conversation emails to each other. Secondly, when the email is not identified as part of a conversation the sender is checked to see if it has been identified as a content provider. When the sender is a content provider, the email is identified as a content email. Thirdly, an email that is neither a conversation email nor a content email is identified as a stand-alone email.

Optionally, the classification is updated periodically and/or when a new email is received. Note that when a new email is received the status of previously-received emails may change. For example, a stand-alone email may become reclassified as part of a conversation once replies to this email start being sent/received. In another example, multiple emails from a single sender may be grouped into a content item, after analysis shows that these emails are sent by a legitimate content provider (e.g. are not spam).

Content Email Management Module

Content email management module 150 obtains content emails from a content provider. Content emails are obtained by content email management module 150 from content providers by one or both of:
 i) The service provider email server (by any means known in the art); and
 ii) A bypass channel which enables content providers to send email to the content recipient without routing the email through a service provider email server.

Optionally bypassing the provider email server is implemented by one or both of: routing the email via bypass server(s) and direct messaging between the content provider and email client, as described in more detail below.

Grouping Module

Grouping module 180 groups the content emails from a particular content provider for display as a single content item. Optionally, emails from a particular conversation are also grouped into a conversation item. The conversation item may be ungrouped by the user, for display as individual emails.

Grouping content emails, and optionally conversation emails, results in significant space savings on the display (e.g. Inbox screen), since a large mass of emails collapses into update items (and optionally into conversation items).

Optionally, the content item includes further information including one or more of:
 i) The content provider; and
 ii) The number of emails grouped in the content item.

Figure 2:
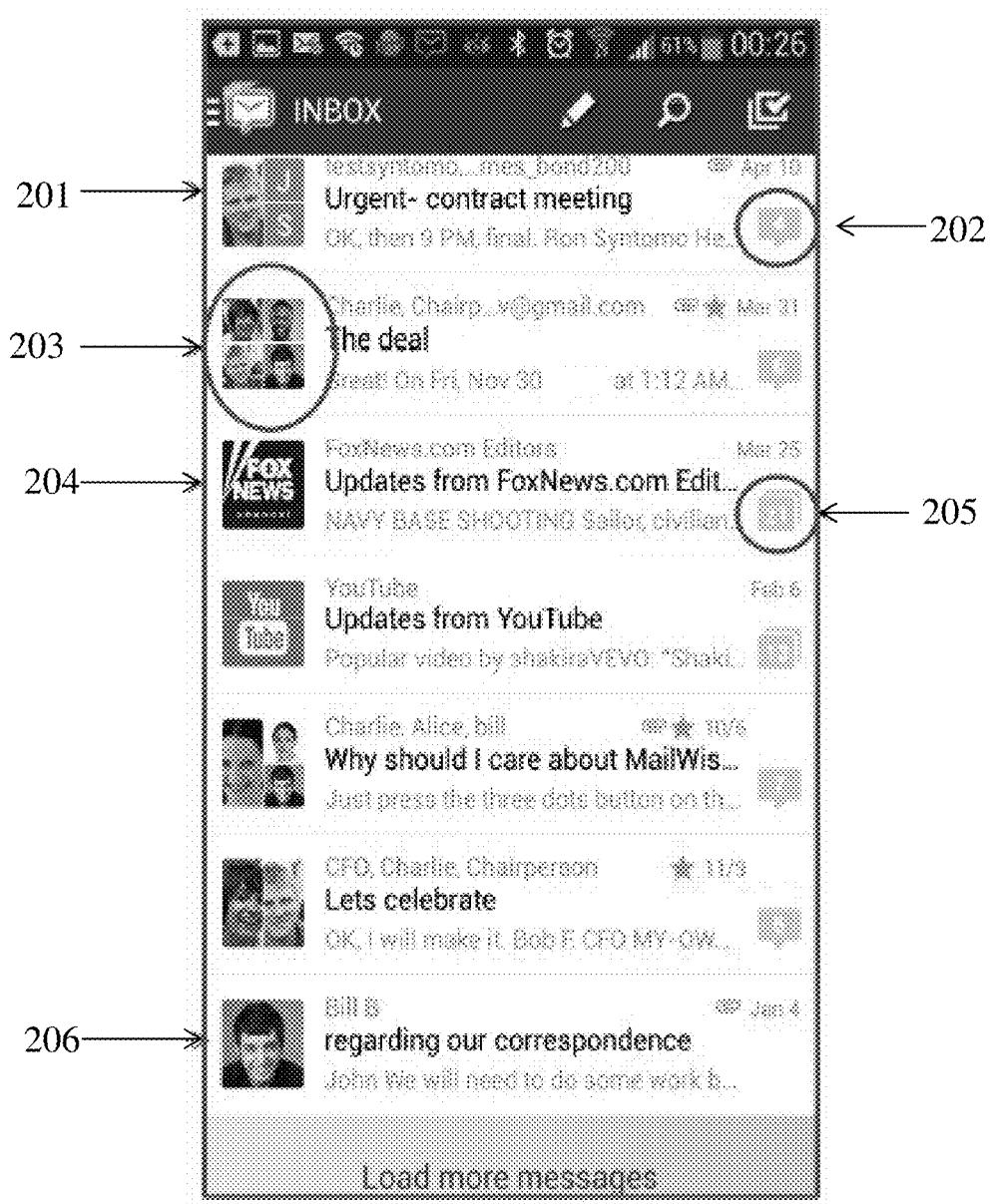
FIG. 2 shows an exemplary grouped email Inbox.

Reference is now made to FIG. 2, which shows an exemplary email Inbox with grouped email items. FIG. 2 shows three classes of emails:
 1) Conversation items (e.g. 201 and 203);
 2) Content items (e.g. 204); and
 3) A stand-alone email (e.g. 206).

Optionally the number of emails in a conversation is marked as in 202 and/or the number of emails in an update group is marked as shown in 205.

Figure 3:
FIG. 3 shows an example of content emails ungrouped from a content item.

Optionally, tapping on a content item (e.g. 204) opens a screen which contains some or all of the update group emails (see FIG. 3).

Optionally, tapping on a conversation item opens a screen with the respective conversation emails. Optionally, an indicator (e.g. words printed in bold) is displayed on the content item (204) or on the conversation item (201) to indicate whether the grouped item contains new unread emails.

FIG. 3 shows an example of ungrouped content emails, displayed when a content item is opened (i.e. 204). Optionally, an entry corresponds to a single email.

Alternately or additionally, an entry corresponds to a sub-group of the update group emails.

Bypass Email Handling Module

In some embodiments email client 100 includes bypass email handling module 170 which implants emails received via the bypass channel into an email account, as described below.

Optionally, email client 100 accesses and manages email for another email address (denoted herein the "bypass email address") which is established on a bypass server, as described in more detail below.

Optionally, the sender routes emails to the email client via the bypass channel by sending content email to a bypass email address established on a bypass email server.

Optionally, the bypass channel includes direct communications between the email client and the content provider, which may be implemented by any means known in the art.

Optionally, when an email is received via the bypass channel, bypass email handling module 170 implants the email into the email account by performing one of:
 i) Auto-forwarding the email received over the bypass channel to the content recipient email address, with a reply field set to the content recipient email address;
 ii) Auto-forwarding the email received over the bypass channel to the content recipient email address, with a reply field set to the content provider address;

iii) Inserting the email received over the bypass channel into a specified email folder of the email client (e.g. Inbox); and iv) Inserting the email received over the bypass channel synchronously into a specified email folder of the email client and into a respective folder of the content recipient email address established on the service provider email server (i.e. up-syncing to the service provider email server).

Optionally, some or all of the emails received over the bypass channel are content emails. Using a bypass email server addresses the blocking problem by creating a bypass "channel" in which content emails do not go through the service provider email server and therefore cannot be blocked.

Optionally, the email client may suspend either email grouping and/or receiving content email over a bypass channel in accordance with input from a user interface of the email client. This enables the user to "opt out", temporarily or permanently, of these content email handling possibilities.

Figure 4A:
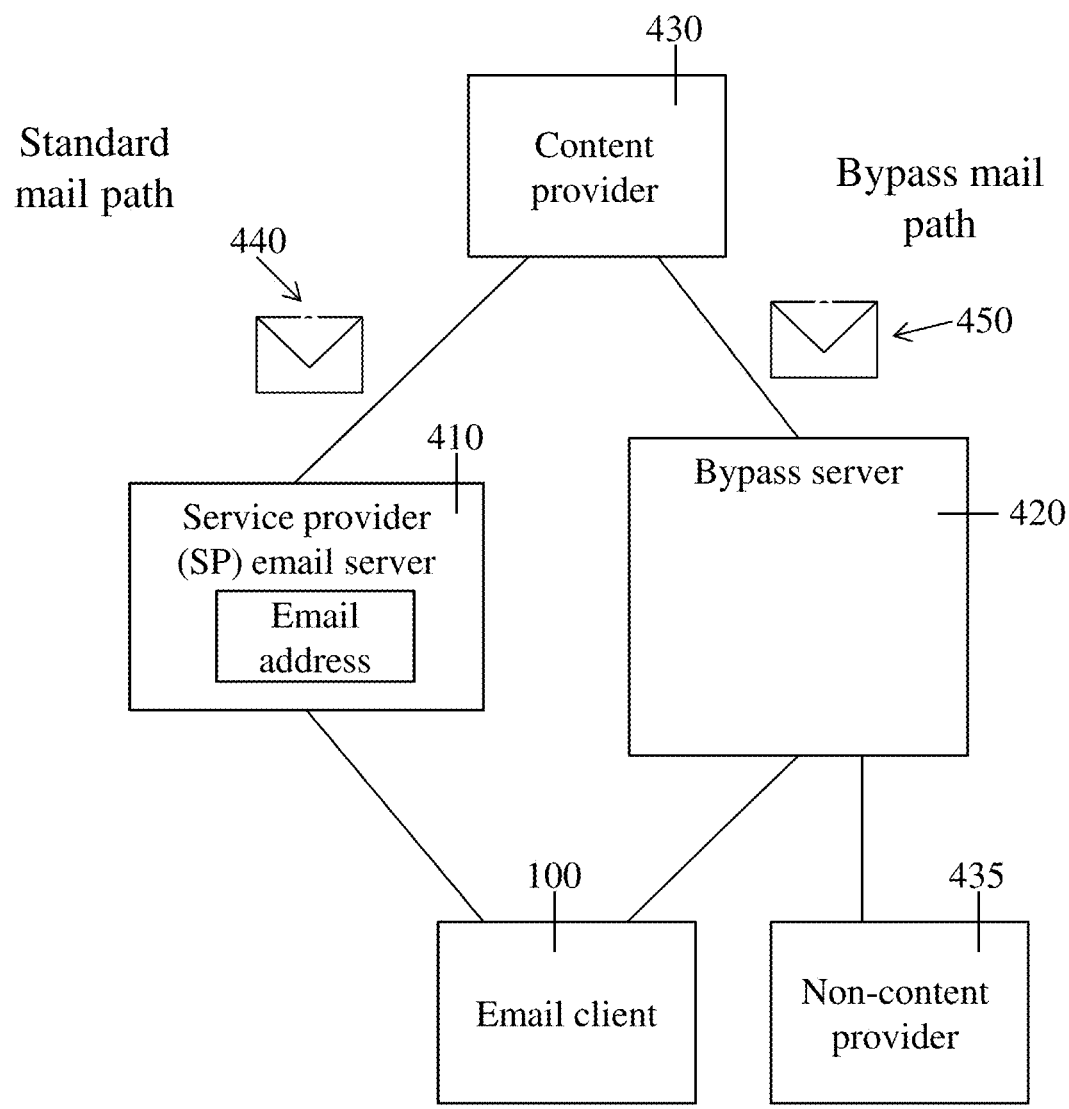
FIG. 4A is a simplified diagram of an email system with bypass channel, according to embodiments of the invention.

Reference is now made to FIG. 4A, which is a simplified diagram of an email system with bypass channel according to embodiments of the invention. FIG. 4A shows content email 440 being sent by the content provider 430 to email client 100 by a standard mail path (via service provider email server 410), and also shows content email 450 being sent by the content provider 430 to email client 100 by a bypass channel (via bypass server 420). Optionally, the bypass channel is used by senders who are not content providers (435), and content from these senders is implanted in an email account as described above.

Optionally, the email client manages multiple email accounts. Content providers may send content emails to the email client through the multiple client accounts, and the content emails may be grouped by the email client for each email address. Many configurations are possible, based on the email grouping embodiments discussed herein. For example, multiple content providers which directing content to different or the same email accounts may all be directed to send content emails via the same bypass channel. In other embodiments, the email client may establish multiple bypass channels.

Many system configurations are possible, in accordance with embodiments of the invention.

Figure 4B:
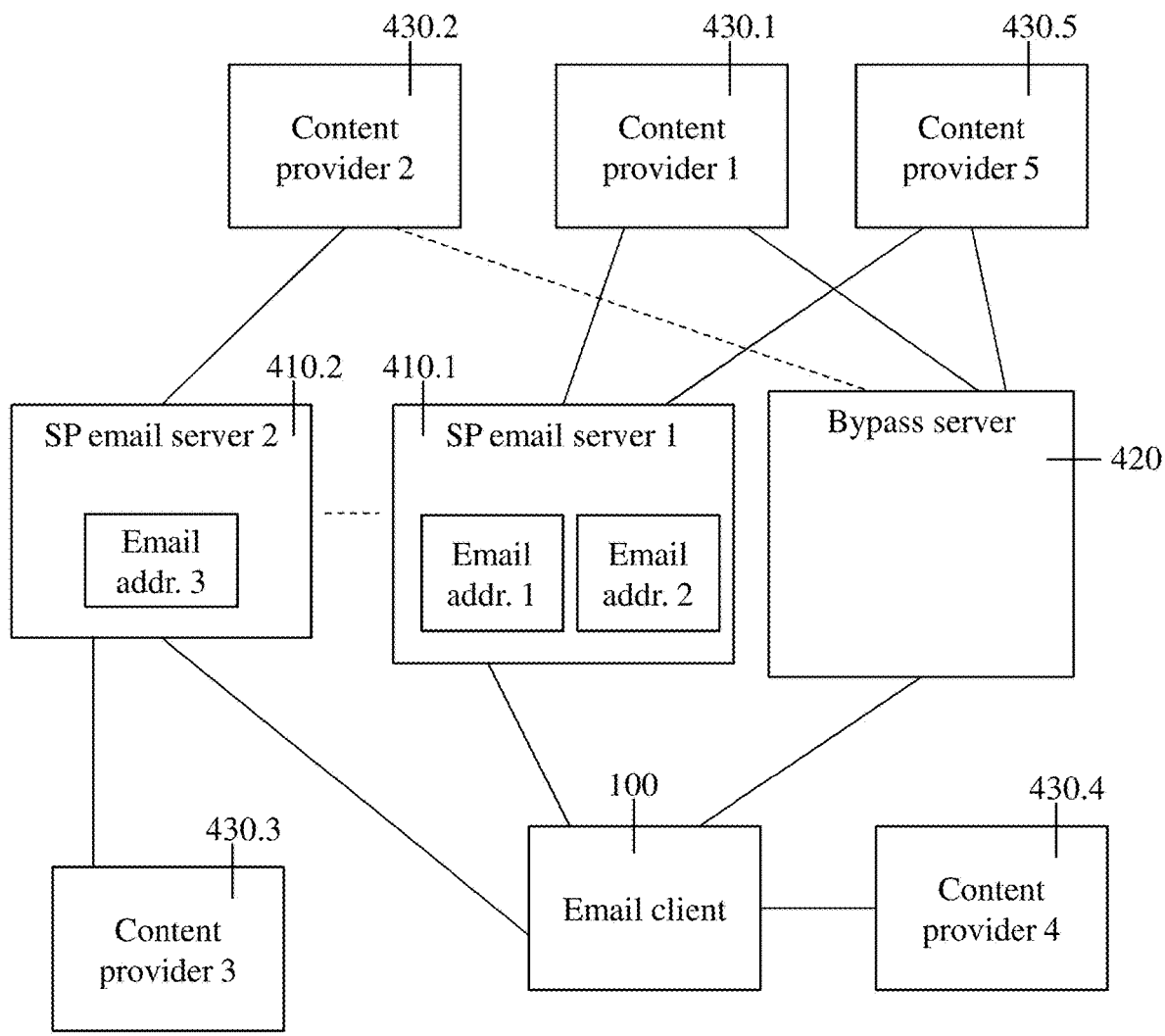
FIG. 4B is a simplified diagram of an email system with bypass channel for an email client managing multiple email accounts, according to embodiments of the invention.

FIG. 4B is a simplified diagram of an email system with bypass channel for an email client managing multiple email accounts, according to embodiments of the invention. Email client 100 manages three email accounts with respective email addresses. Two of the accounts are on service provider (SP) server 1 (410.1), which receives content email from content provider 1 (430.1). One account is on SP server 2 (410.2) which receives content email from content provider 2 (430.2) and content provider 3 (430.3). Both content provider 1 (430.1) and content provider 2 (430.2) may use the same bypass channel via bypass server 420. Optionally different content providers use different bypass servers (not shown). Content provider 4 (430.4) connects to email client 100 directly, and a bypass server is not required. Content provider 5 (430.5) and content provider 1 (430.1) go to the same email address (on 410.1) and use the same bypass server 420.

Exemplary Content Email Delivery Over a Bypass Channel

Figure 4C:
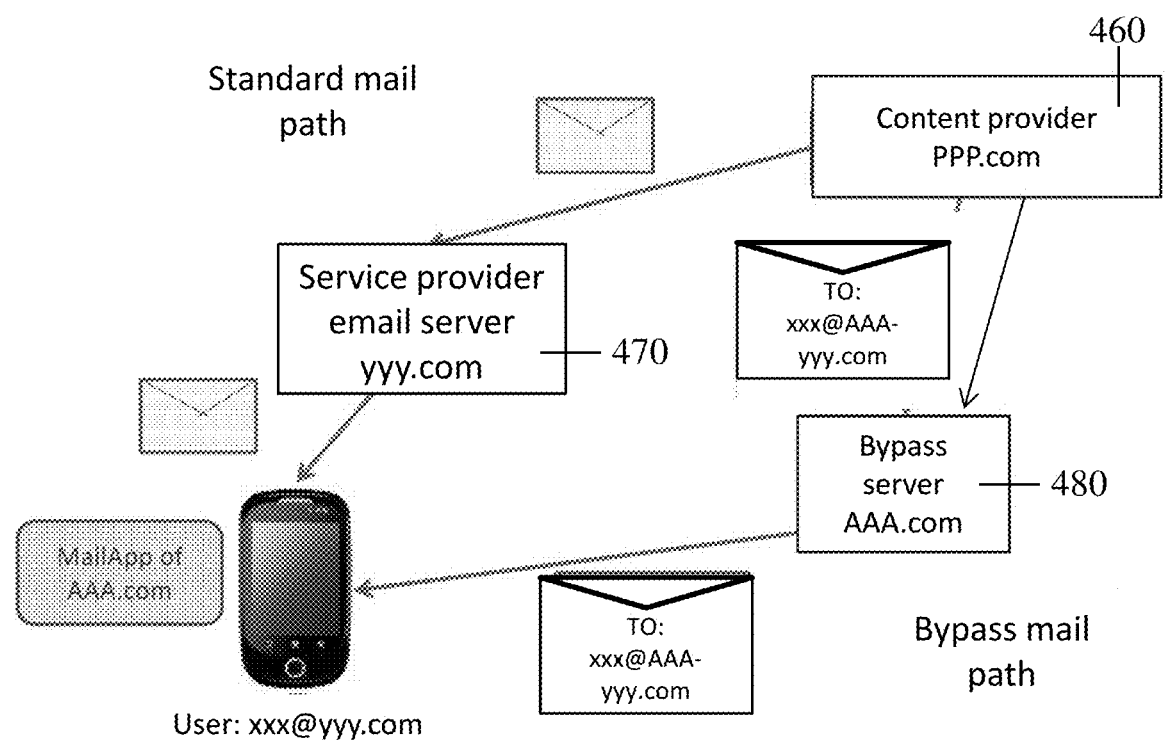
FIG. 4C is a simplified diagram of an email system with bypass channel, according to an exemplary embodiment of the invention.

Reference is now made to FIG. 4C, which is a simplified diagram of an email system with bypass channel using a bypass email server, according to an exemplary embodiment of the invention. In FIG. 4C the content recipient email address is xxx@yyy(dot)com on service provider email server 470. Let the content provider 460 who wants to communicate with the client be denoted PPP, and let the email client application provider be denoted AAA.

AAA opens a bypass email server 480 on which it defines a new domain, and defines a user's email account corresponding to xxx@yyy(dot)com. For example, the domain could be AAA-yyy(dot)com and the bypass email address could be xxx@AAA-yyy(dot)com. This bypass email address is known to PPP. Whenever PPP wants to send email message to xxx@yyy(dot)com it sends it instead to xxx@AAA-yyy(dot)com. Bypass mail server 480 AAA knows the respective client ID of xxx@yyy(dot)com and forwards the email message to it by direct communication, not via the service provider email server. The email client knows to associate email messages that arrived at xxx@AAA-yyy(dot)com with the email address xxx@yyy(dot)com. Other methods of forwarding content email through a bypass server in a manner which enables the email client to associate the content email with the respective content provider may be used.

The email client may handle the email received via bypass email server by one of the following:

1. Display the email in the Inbox of xxx@yyy(dot)com;

2. Up-sync the email to the client Inbox (or other email folder) as if it was a new composed email. From now on the email will behave in the email client and email provider Inbox (or other folder) as a "normal" email (including presentation);

3. Auto-forward the email to the xxx@yyy(dot)com address with the via/inReplyTo field set to PPP sender address. In consequence, when the email arrives at the yyy(dot)com mail server it is unlikely to be blocked, and it will be downloaded again, this time to the real xxx@yyy(dot)com Inbox (and be displayed in the user web interface/outlook); or 4. Auto-forward the email to the xxx@yyy(dot)com address. This way, when the email will arrive to the yyy(dot)com mail server it will not be blocked for sure because it was sent by the user xxx@yyy(dot)com.

In all of the above options, the email client may change the displayed recipient to xxx@yyy(dot)com and to hide the excess forward headers of options 3 and 4. Thus to the user it appears as if the email was received on the account xxx@yyy(dot)com.

The email client may choose to put this email into a content item associated with PPP (e.g. named PPP).

In the event that the user replies to the email, the sent email will be sent in the normal way—that is via the server yyy(dot)com (and the sent email will be kept in the Sent folder of the account xxx@yyy(dot)com).

The advantage of options 2-4 is that the user is able to view the email not only on the email client but also on other mail interfaces (e.g. webmail, outlook, etc).

Option 1 allows the user to view the email only on the email client.

Optionally, the email client presents emails that come through the bypass channel as if they arrived through the standard direct channel. That is, it may present them in the Inbox of xxx@yyy(dot)com. Any email sent from the client and directed to PPP may be treated the standard way (i.e. sent on the primary mail channel via the server yyy(dot)com), and thus will naturally be presented in the Sent folder of xxx@yyy(dot)com.

Method for Email Grouping

Figure 5:
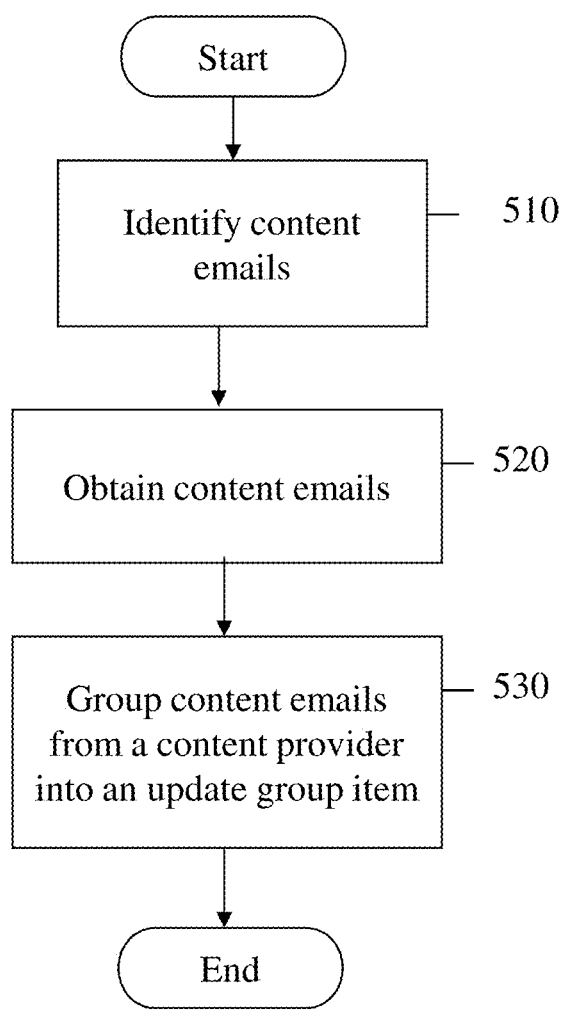
FIG. 5 is a simplified flowchart of a method for grouping emails for display, according to embodiments of the present invention.

Reference is now made to FIG. 5, which is a simplified flowchart of a method for grouping emails for display, according to embodiments of the present invention.

In 510, content emails are identified by analyzing email traffic on a content recipient email address established on a service provider email server. The content emails may be identified by applying a mathematical or logic function to data gathered by monitoring the email traffic in the email account, as described above.

In 520, content emails are obtained from an identified content provider.

Optionally, content emails are obtained by one or more of: through the service provider email account, direct communication with the content provider, forwarding by the bypass server and/or retrieval off the bypass server.

In 530, multiple content emails obtained from a given content provider are grouped for display as a single content item.

Optionally, content emails are obtained over a bypass channel. Optionally the bypass channel includes one or both of: forwarding via a bypass server and direct communication with the content provider.

Optionally, content emails are additionally or alternately obtained from the service provider email server.

Optionally, the method further includes instructing the content provider to send the content emails via the bypass channel. The content provider is provided with the information enabling it to send content email through the bypass channel (e.g. by providing a bypass email address).

Optionally, the bypass server is instructed to provide the bypass email address to the content provider.

The method optionally includes implanting an email received over a bypass channel into an email account by one of:

i) Auto-forwarding the email to the content recipient email address, wherein a reply field of the auto-forwarded email is set to the content recipient email address;

ii) Auto-forwarding the email to the content recipient email address, wherein a reply field of the auto-forwarded email is set to an address of the content provider;

iii) Inserting the email into a specified email folder of the email client; and iv) Inserting the email synchronously into a specified email folder of the email client and a respective folder of the content recipient email address established on the service provider email server.

The method optionally further includes ungrouping a content item into the separate emails included in the content item, and displaying the separate emails individually. The ungrouping may be triggered by input from a user interface of the email client.

The method optionally includes classifying a received email as one of:

i) A conversation email for inclusion in an email conversation item;

ii) A content email for inclusion in a content item; and iii) A stand-alone email for display as an ungrouped email.

The method optionally includes updating the classification upon receipt of a new email at the email client.

The method optionally includes receiving an email via the bypass channel, deriving the content recipient email address to which the received email is directed. The deriving may be rule-based or search-based.

Figure 6:
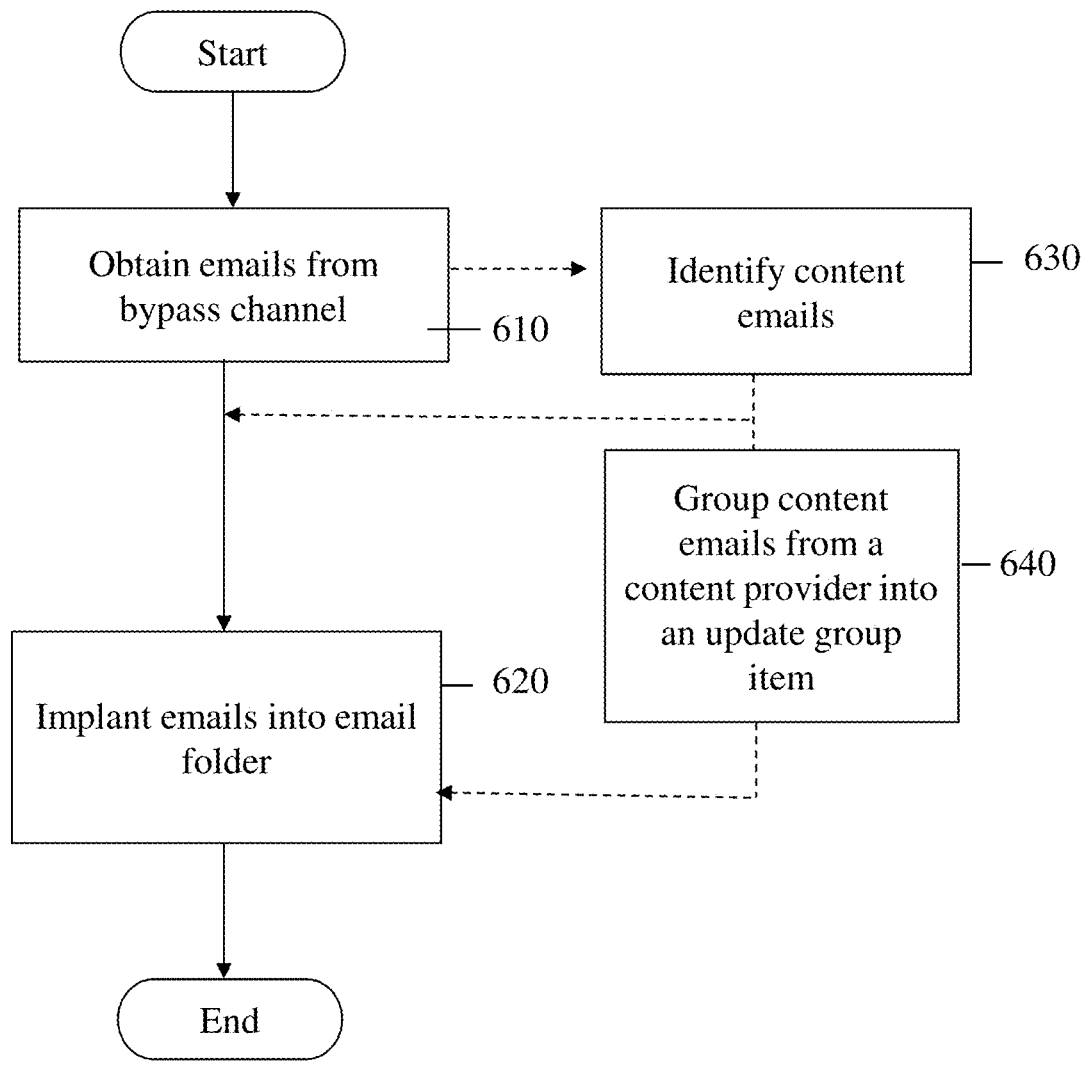
FIG. 6 is a simplified flowchart of a method for managing emails received over a bypass channel, according to embodiments of the present invention.

Reference is now made to FIG. 6, which is a simplified flowchart of a method for managing emails received over a bypass channel, according to embodiments of the invention.

In 610, emails are obtained over a bypass channel. The bypass channel may be implemented by any means known in the art. Optionally, email is forwarded via a bypass server.

Optionally, email is additionally or alternately sent over a direct channel established between the sender and the email client.

In 620, emails received over bypass channel are implanted into an email account. Optionally, email implanting is performed by one, some or all of the ways described above.

In some embodiments, the method further includes 630 and optionally 640. In 630, content emails are identified by analyzing email traffic obtained over the bypass channel. The content emails may be identified by applying a mathematical or logic function to data gathered by monitoring the email traffic in the email account, as described above. Senders of content emails are classified as content providers.

In 640, multiple identified content emails from a single content provider are grouped for display as a single content item.

Optionally, the method further includes obtaining content email from the service provider email server.

The methods as described above are used in the fabrication of integrated circuit chips.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant emails, email clients, email applications, email servers and user interfaces will be developed and the scope of the terms email, email client, email application, server and user interface is intended to include all such new technologies a priori.

The terms "comprises", "comprising", "includes", "including", "having" and their conjugates mean "including but not limited to". This term encompasses the terms "consisting of" and "consisting essentially of".

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

The invention claimed is:

1. A system for managing an email client comprising:
a network interface for electrical communication with at least one service provider email server;
a hardware processor in electrical communication with said network interface;
a user interface;
an identification module in electrical communication with said network interface and said hardware processor, configured to identify a subgroup of emails directed to a first email address established on a first service provider email server as content emails, by analyzing email traffic, to determine respective senders of the identified content emails, and to classify senders of said identified content emails as content providers, wherein the identification module is further configured to identify emails belonging together to an email conversation;
a content email management module in electrical communication with said network interface, said hardware processor, said user interface and said identification module, configured to obtain said identified content emails; and
a grouping module in electrical communication with said hardware processor, said user interface and said content email management module configured to group a plurality of obtained content emails not identified as part of a conversation and received from a single content provider, for display as a respective single content item, such that the content emails from each content provider are grouped into a single respective content item,
wherein said grouping module is further configured to ungroup said single content item for display as separate emails from said single content provider, in accordance with input from said user interface.

2. The system for managing an email client according to claim 1, wherein said identification module is further configured to identify content emails by analyzing email traffic in a second email address established on a second service provider email server.

3. The system for managing an email client according to claim 1, wherein said content email management module is configured to receive content emails of the first email address over a bypass channel, without passing through the first service provider email server.

4. The system for managing an email client according to claim 3, further comprising a bypass email handling module configured to implant a content email received over said bypass channel into an email account including emails received through the first service provider email server.

5. The system for managing an email client according to claim 4, wherein bypass email handling module is configured to perform at least one of the following;
provide a content provider with a bypass email address for sending content emails to an email client via said bypass server;
auto-forward an email, received from said content provider via said bypass channel, to said first email address, wherein a reply field of said auto-forwarded email is set to an address of said content provider;
auto-forward an email, received from said content provider via said bypass channel, to said first email address, wherein a reply field of said auto-forwarded email is set to said first email address;
insert an email, received from said content provider via said bypass channel, into a specified folder of an email client;

insert an email, received from said content provider via said bypass channel, synchronously into a specified email folder of said email client and a respective folder of said first email address established on said first service provider email server.

6. The system for managing an email client according to claim 1, wherein said obtaining comprises receiving emails from said identified content provider at said first email address; wherein said content email management module is further configured to insert said received email into a specified email folder of an email client.

7. The system for managing an email client according to claim 1, wherein said single content item further comprises at least one of:
   i) said respective content provider; and
   ii) a number of emails grouped in said content item.

8. The system for managing an email client according to claim 1, wherein the grouping module displays the respective single content item in an Inbox screen.

9. The system for managing an email client according to claim 1, wherein said grouping module is further configured to group emails participating in said email conversation for display as a single conversation item.

10. The system for managing an email client according to claim 9, wherein said grouping module is further configured to ungroup said single conversation item for display as separate emails participating in said conversation, in accordance with input from said user interface.

11. The system for managing an email client according to claim 1, wherein said identification module is further configured to identify stand-alone emails for display as ungrouped emails.

12. The system for managing an email client according to claim 1, wherein said identification module is configured to include each received email in a single item, wherein said item is one of: a conversation item, a content item and a stand-alone item.

13. The system for managing an email client according to claim 1, wherein said identification module is configured to identify content email by determining a number or proportion of emails from each sender, which participate in email conversations.

14. The system for managing an email client according to claim 1, wherein said identification module is configured to identify content email by determining a number of conversations with each sender.

15. The system for managing an email client according to claim 1, wherein said identification module is configured to identify the content emails responsively to statistics from other email recipients.

16. The system for managing an email client according to claim 1, wherein said identification module is configured to identify the content emails based on message statistics from other email recipients.

17. The system for managing an email client according to claim 1, wherein said identification module is configured to identify the content emails based on information from other sources.

18. The system for managing an email client according to claim 1, wherein the display as a single content item comprises display of a single entry, representing the plurality of obtained content emails not identified as part of a conversation, in an inbox screen listing incoming emails.

19. The system for managing an email client according to claim 18, wherein the display of a single entry in the inbox screen comprises displaying the single entry with a number of content emails represented by the single entry.

20. The system for managing an email client according to claim 18, wherein said identification module is configured to identify content email by determining a number or proportion of emails from each sender, which participate in email conversations.

21. The system for managing an email client according to claim 18, wherein said identification module is configured to identify content email by determining a number of conversations with each sender.

22. The system for managing an email client according to claim 18, wherein said identification module is configured to identify the content emails responsively to statistics from other email recipients.

23. The system for managing an email client according to claim 18, wherein said identification module is configured to identify the content emails based on message statistics from other email recipients.

24. The system for managing an email client according to claim 18, wherein said identification module is configured to identify the content emails based on information from other sources.

25. A method for grouping emails for display, comprising:
   using at least one processor to perform the following:
   analyzing email traffic to identify a subgroup of emails, directed to a first email address established on a first service provider email server, as content emails;
   analyzing the email traffic to identify emails belonging together to an email conversation;
   determining respective senders of the identified content emails;
   classifying senders of emails identified as content emails, as content providers;
   identifying email messages from senders classified as content providers, for which no response was sent, as content emails;
   obtaining said identified content emails;
   grouping a plurality of obtained content emails not identified as part of a conversation and received from a single content provider, for display as a respective single content item, such that the content emails from each content provider are grouped into a respective single content item;
   receiving an input from a user through a user interface; and
   ungrouping said single content item for display as separate emails from said content provider, in accordance with the received input through said user interface.

26. The method according to claim 25, wherein said at least one processor is used to perform the following: identifying content emails by analyzing email traffic on a second email address.

27. The method according to claim 25, wherein analyzing the email traffic comprises determining a number or proportion of emails from each sender, which participate in email conversations.

28. The method according to claim 25, wherein analyzing the email traffic comprises determining a number of conversations with each sender.

29. The method according to claim 25, wherein analyzing the email traffic comprises identifying content emails responsively to statistics from other recipients.

* * * * *